United States Patent [19]

Ponzio et al.

[11] Patent Number: 5,799,912

[45] Date of Patent: Sep. 1, 1998

[54] MOBILE REST EQUIPMENT FOR A WORKPIECE WITH VARIABLE DISTANCE SUPPORT ARMS FOR AUTOMATIC PRODUCTION LINES

[75] Inventors: Massimo Ponzio, Barberino V. Elsa; Fabrizio Cresti, Tavernelle V. Pesa, both of Italy

[73] Assignee: ATOP s.p.a., Barberino V. Elsa, Italy

[21] Appl. No.: 686,364

[22] Filed: Jul. 24, 1996

[30] Foreign Application Priority Data

Jun. 8, 1996 [IT] Italy ................... PI96A0033

[51] Int. Cl.$^6$ ........................................... F16L 3/00
[52] U.S. Cl. ..................... 248/121; 248/298.1; 248/201
[58] Field of Search ........................... 248/222.51, 201, 248/298.1, 309.1, 121

[56] References Cited

U.S. PATENT DOCUMENTS

| 1,849,305 | 3/1932 | Magarian | 248/298.1 |
| 2,402,041 | 6/1946 | Greenleaf et al. | 249/201 |
| 2,803,986 | 8/1957 | Choiniere et al. | 248/298.1 X |
| 2,805,479 | 9/1957 | Droste | 248/298.1 X |
| 5,158,256 | 10/1992 | Gross | 248/298.1 X |
| 5,337,987 | 8/1994 | Sawatsky | 248/222.51 X |

FOREIGN PATENT DOCUMENTS 1393851  5/1975  United Kingdom ............. 248/222.51

*Primary Examiner*—Peter N. Cuomo
*Assistant Examiner*—Stephen Vu
*Attorney, Agent, or Firm*—Browdy and Neimark

[57] ABSTRACT

A pallet for automatic production lines, comprising a base (1) on which a guide (5) is mounted on which support arms are engaged for a workpiece (16). The arms (13) allow a movement on a transverse plane with respect to the axis of guide (5) between a first and a second position, in particular a rotation movement. In the first position, the arms are able to either translate along the guide or be moved away from it in a transverse direction, in the second position the support arms auto-lock onto the guide through resilient means (21). The pallet has therefore variable distance support arms which are able to auto-lock onto the guide and are easy to be unclamped by it without requiring neither separate locking/unlocking devices, nor, consequently, regulation means able to interact with said devices. The pallet can be adjusted with no modifications to operate both on a line with a station of automatic regulation and on a line with a station of manual regulation.

19 Claims, 3 Drawing Sheets

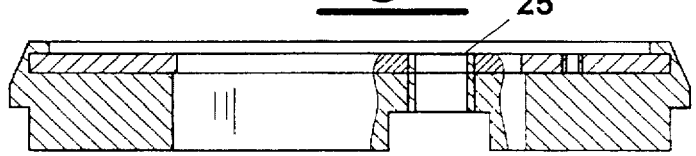
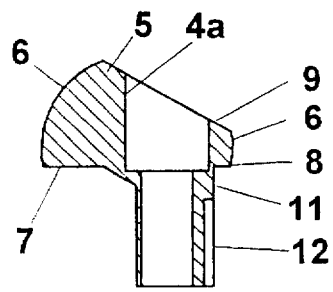
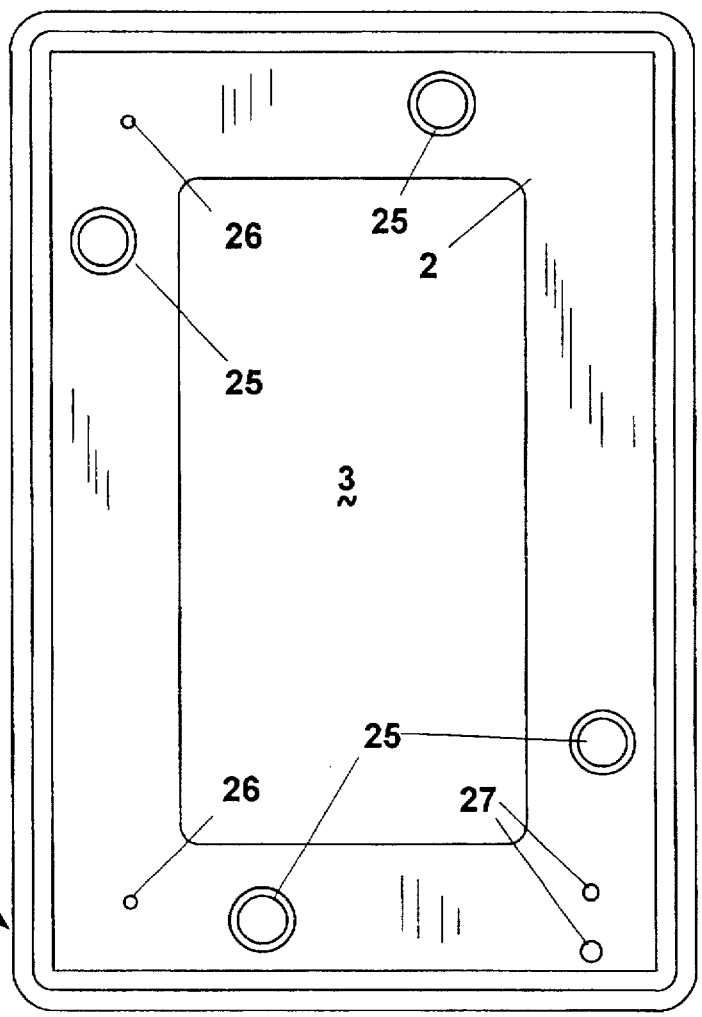
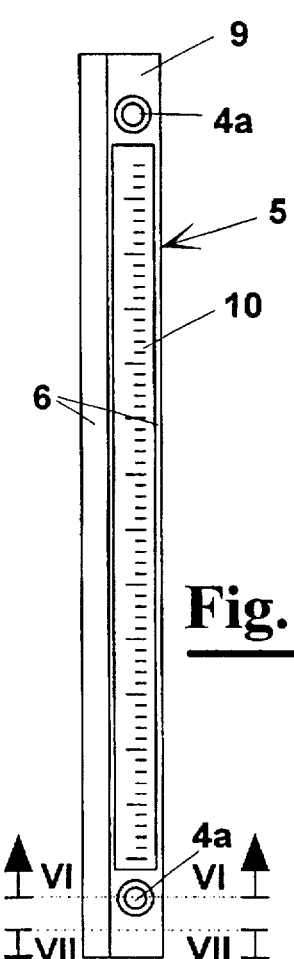
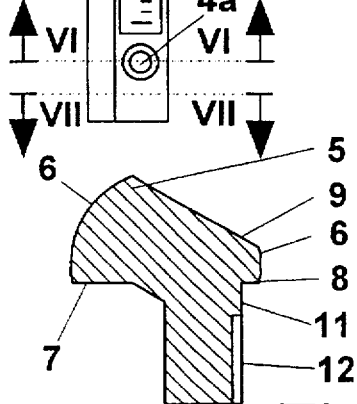
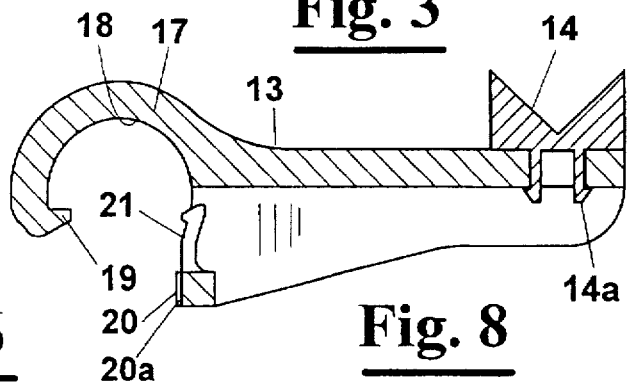

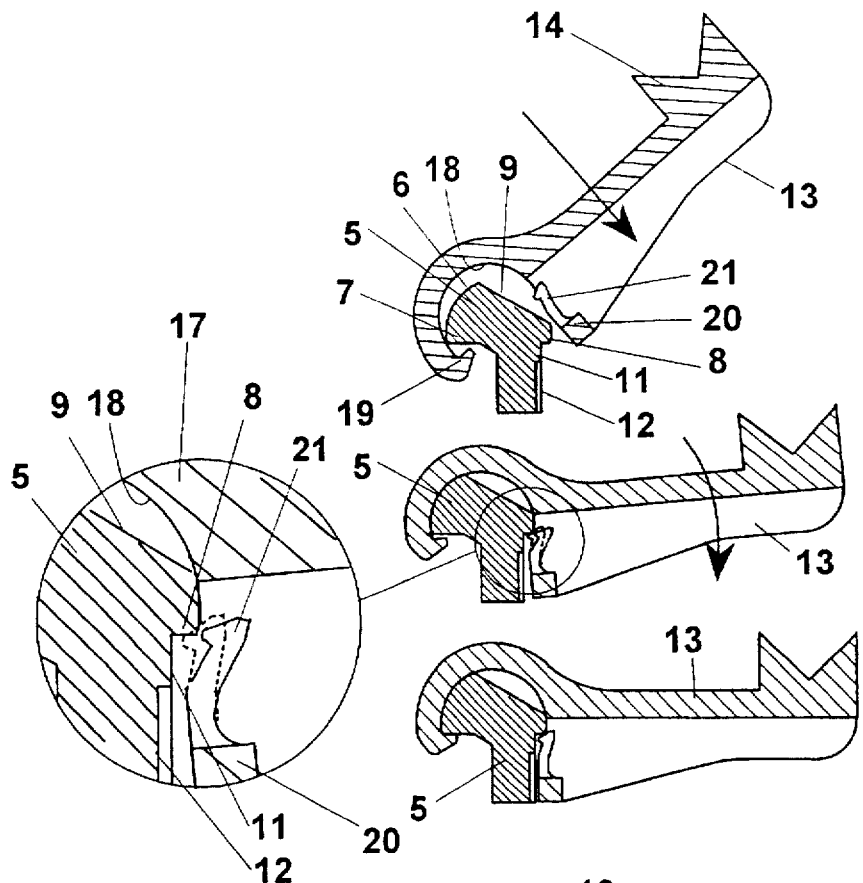
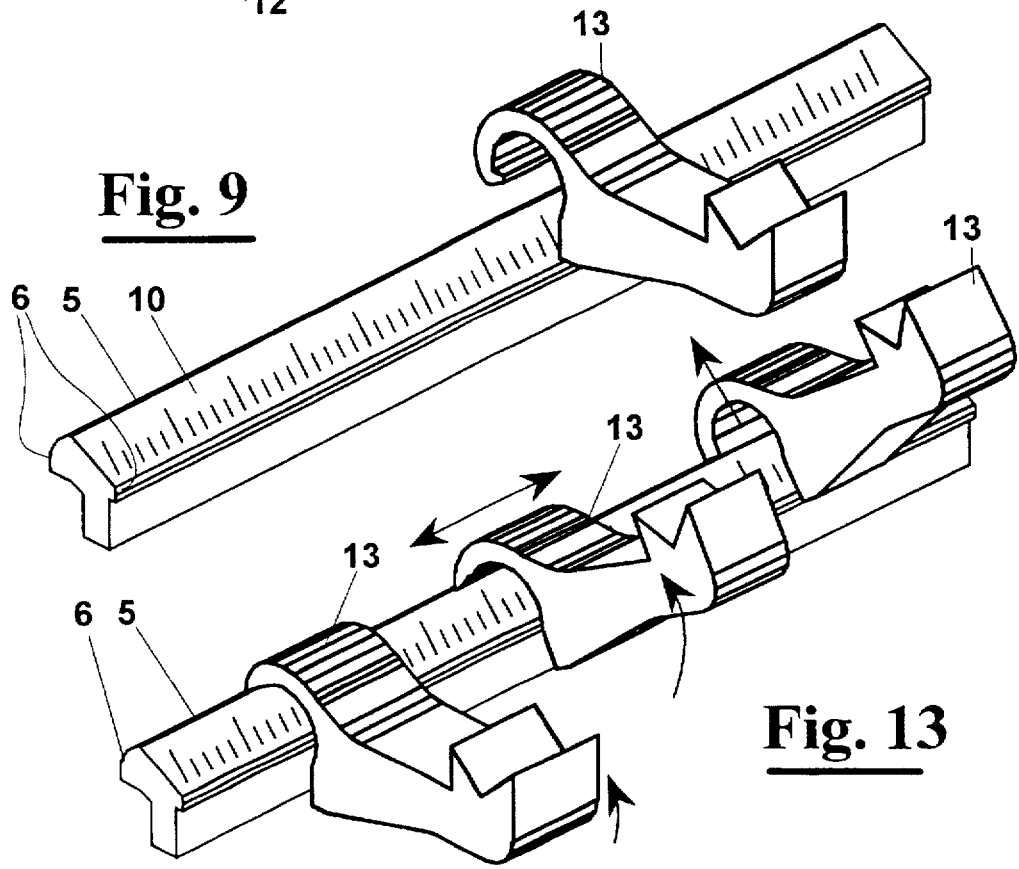

MOBILE REST EQUIPMENT FOR A WORKPIECE WITH VARIABLE DISTANCE SUPPORT ARMS FOR AUTOMATIC PRODUCTION LINES

FIELD OF THE INVENTION

The present invention relates to a piece of equipment for automatic production lines and, more precisely, it relates to mobile rest equipment for workpieces of different sizes, with variable distance support arms.

DESCRIPTION OF THE PRIOR ART

There are automatic production lines in which the workpieces are arranged on mobile rest equipment, known in the art as pallets and hereinafter referred to as such, which support them and carry them through one or more workstations.

More precisely, each pallet positioned in an entry station to receive a workpiece proceeds on a conveyor which makes it selectively advance through the workstations. In every station, if that is the case, the workpiece will be offered to a machine which collects it from the pallet, works on it and places it again on the pallet, which then resumes moving. During the manufacturing time in one station, the pallet can either continue to rest on the conveyor below, for instance of the belt type, kept locked in a frictional contact with the belt itself, or can be either lifted or removed from the conveyor, for instance taken to a waiting station. At the end of the manufacturing phase, the pallet is either emptied or re-positioned on the conveyor so as to be able to proceed to the next workstation.

Alternatively, the workpieces can be worked on directly on their individual pallet while the pallet is kept still on the conveyor or, as before, either lifted or removed from it.

There are production lines of the rigid type, namely, they are prepared to receive either only workpieces of the same size or groups of workpieces of substantially similar sizes. In this case, when the line is started, the pallets are prepared to receive such workpieces and are not modified until that manufacturing campaign is completed. When it is necessary to substantially vary the workpieces' sizes, the line is shut down and both pallets and machines are prepared to receive the new workpieces.

On the contrary, when the machines provided for in the different workstations are of the flexible type, namely, they can be adjusted in a short time to receive workpieces of different sizes, consequently, the pallets must be regulated accordingly in real time shortly before receiving each workpiece.

There are manually regulable pallets, namely comprising supports which can be moved at will and locked in a precise position to receive the workpieces. A traditional manually regulable pallet requires the release of the supports, for instance through screw links, so that they can be translated to the new position in which they are then locked to firmly carry the workpieces. This operation can be carried out while the pallet proceeds on the line awaiting to receive a new workpiece, for example removing it and re-positioning it soon after the regulation.

Alternatively, in the case of manufacture of sets of workpieces of a similar dimension, while a first set of workpieces taken by a first group of pallets is being worked on, a second group of pallets can be prepared which completely replaces the first group, just when the workpieces belonging to the second set are to be put on the line to be worked on.

However, the shift from the first to the second set of workpieces leads to some disadvantages, among which the main ones are either a significant slackening or a shut-down of the production, the increase of the costs due to the need of more sets of pallets, and errors in the pallets' position on the line when they must be positioned in a particular order.

Pallets with automatically adjustable supports are already known. For instance, in EP 348715, a pallet is described for the manufacture of armatures for electrical motors provided with a pair of V-shaped supports which receive the ends of the armature's shaft. The V-shaped supports are installed through prismatic coupling on guides integral with the pallet. Means, such as endless screws, automatically operated in different ways to a station of regulation, are provided in order to shift the supports along the guides. Locking devices keep the supports still with respect to the guides until, in the station of regulation, they are released unclamping the supports and allowing them to be translated along the guides by motorised means which move them to the new position. In all the different embodiments described, however, the pallet is complex and heavy to build and requires complex regulation means.

In IT 5107/A/89, a similar pallet is described having variable distance supports along with the respective regulation means. The supports have the form of a plate with a V-shaped housing and are installed on a pair of parallel guides on which they can slide, approaching or moving away from each other when they are not kept still by locking devices. A regulation equipment offers a pair of horizontally and vertically transferable heads, suitable to release the locking devices and at the same time to arrange the supports in the new position.

Finally, in EP 447805, a pallet is described with a simpler structure having substantially the form of a frame bounding a central aperture. On the frame, a T-shaped guide is installed with which sliding support arms having a V-shaped end to receive the workpiece to be worked on engage the workpiece. Locking devices are provided which locking device resiliently push the support arms with a friction against the T-shaped guide and which can be automatically unclamped to let the arms slide on the guide, operated by translating regulation heads.

The currently known automatically regulable pallets described hereinabove cannot be easily adjusted by rapid manual regulation by an operator. In fact, in the case of small to medium size lines, it is not necessary to arrange a station of automatic regulation of the distance between the supports. However, the traditional automatic regulation pallets mentioned hereinabove would lead to an excessive slackening of the manufacturing process, in the case of small to medium size lines with high flexibility and production rate.

Furthermore, the currently known automatically regulable pallets described hereinabove require locking devices of the supports' sliding movement. Consequently, they require means to regulate the supports' position which must also be able to unclamp the supports from the locking devices before moving them. This involves a complexity in building both the pallet and the automatic regulation means.

SUMMARY OF THE INVENTION

On the contrary, it is an object of the present invention to provide a mobile work rest equipment for automatic manufacture lines, hereinafter referred to as pallet, having variable distance support arms able to auto-lock onto the guides and easy to unclamp themselves without requiring neither separate locking/unlocking devices, nor, consequently, regulation means able to interact with said devices.

It is another object of the present invention to provide a pallet able to be adjusted with no modifications to operate both on a line with a station of automatic regulation and on a line with a station of manual regulation.

These and other objects are attained by the mobile rest equipment for a workpiece for automatic production lines, hereinafter referred to as pallet, comprising a base on which a guide having a longitudinal axis is mounted, on said guide being engaged support arms for a workpiece, whose characteristic is that said arms allow a movement on a transverse plane with respect to said guide's axis between a first and a second position, in the first position said support arms being able to either translate along said guide or be removed from it in a direction transverse to said axis, in the second position said support arms auto-locking to said guide.

Preferably, the arms' movement on the plane transverse to the guide is a rotation with respect to the guide's axis between a first and a second angular position.

BRIEF DESCRIPTION OF THE DRAWINGS

Further characteristics and advantages of the equipment according to the present invention will be made clearer in the description which follows of one of its possible embodiments, given as an example, but not limitative, with reference to the above-mentioned drawings, in which:

FIGS. 3 and 4 are respectively top plan and transversal views of the base of the pallet of FIG. 1;

FIG. 5 is a top plan view of a guide able to engage with the base of FIG. 3;

FIGS. 6 and 7 are enlarged transversal views respectively according to arrows VI—VI and VII—VII of the guide of FIG. 5;

FIG. 8 is a longitudinal view of a support arm of the pallet of FIGS. 1 and 2;

FIG. 9 in a perspective view of the guide of FIGS. 5, 6 and 7 and of the support arms of FIG. 8;

FIGS. 10, 11 and 12 are a sectional view of three consecutive phases of the engagement between the support arm and the guide of FIG. 9;

FIG. 13 is a unique perspective view of the three engagement/disengagement phases between the support arm and the guide of FIG. 9.

DESCRIPTION OF THE PREFERRED EMBODIMENT

Figure 1:
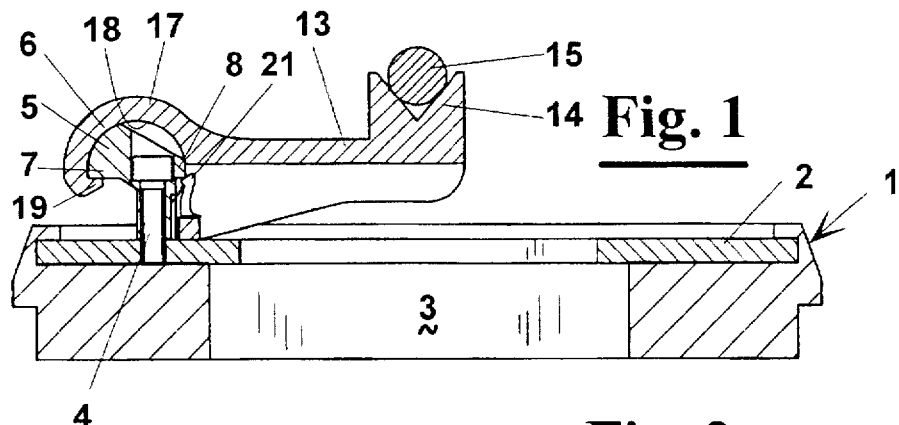
FIGS. 1 and 2 are respectively transverse and top plan view of a pallet according to the invention.
Figure 2:
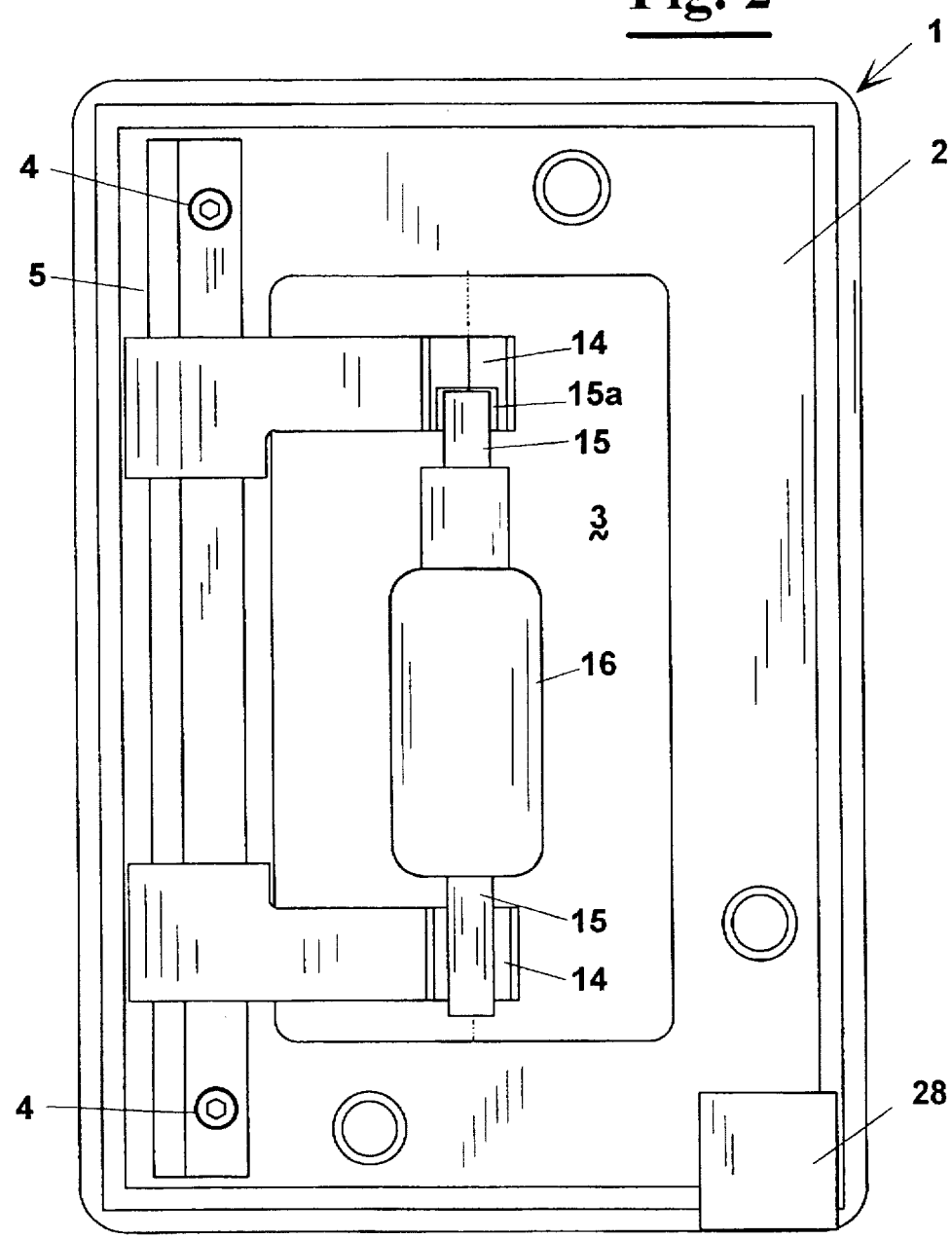

With reference to FIGS. 1 and 2, a mobile work rest equipment for automatic manufacture lines, hereinafter referred to as pallet, comprises a rigid base 1 having a substantially rectangular form, made of a light material, for instance resin, strengthened by a metal plate 2, having at its centre a wide aperture 3. A prismatic guide 5 is fixed to plate 2 of base 1, through screws 4 housed in holes 4a, and presents on all its length a portion with a cylindrical surface 6 which expands transversely in an arc of 180° and whose rims are formed by a first and a second step-shaped edge, respectively 7 and 8 diametrically opposed one to the other. The portion with a cylindrical surface 6 has a flattening 9 able to receive a graduated line 10, visible in FIGS. 5, 9 and 13. As it is better shown by the enlarged sections of FIGS. 6 and 7 of the guide of FIG. 5, under the step 8 a flat reference face 11 having a knurled surface 12 is provided for.

Always with reference to FIGS. 1 and 2, with guide 5 of the pallet two support arms 13 engage in an auto-locked position in which sliding is impossible, as shown in FIG. 1, but which can be either easily arranged in free-sliding position with respect to guide 5, or separated from the guide itself, as described in detail hereinafter. The two support arms 13, shown enlarged also in FIG. 8, have a free end 14 with a V-shaped section able to support shaft 15 of a workpiece 16, for example an armature of an electrical motor. As shown in FIG. 2, one of the two arms 13 can have a V-shaped end having a cavity 15a to receive the workpiece and at the same time providing it with a shoulder. The end 14 can either be made in one part integral to support arm 13 (FIG. 1 and FIGS. 9–13) or, according to the solution illustrated in FIG. 8, be formed by an insert able to snap fit with arm 13 through a slot 14a. In this way, the ends 14, maintaining the same support arms, can be modified to choose those most suitable for the workpiece to be supported.

On the opposite side of free end 14, the arms 13 have an open tubular sleeve 17 with an internal housing 18 with a cylindrical surface, having a nominal diameter equal to the portion with a cylindrical surface 6 of guide 5. The opposite longitudinal rims of open sleeve 17 comprise respectively a tooth 19, able to engage with the first step 7 of guide 5, and a reference face 20, able to engage against reference face 11 of guide 5, the contact in particular occurring between a knurled surface 20a of the former and the knurled surface 12 of the latter. Furthermore, a resilient tooth 21 is provided for facing into housing 18, able to engage in a snap fitted contact against step 8 of guide 5.

As regards to base 1, it also presents a reference hole 25 for dowel pins, holes 26 to anchor the screws of guide 5 and holes 27 to secure a unit 28, necessary for the pallet's identification on the line (shown in FIG. 2).

With reference to FIGS. 9–13, each support arm 13 engages on guide 5 as follows. Starting from a situation where support arm 13 is completely disengaged from guide 5 (FIG. 9), it is necessary to rotate it as shown in FIG. 10 and to move it orthogonally towards the guide itself so that tooth 19 passes under step 7. Afterwards, (FIG. 11) it is necessary to rotate support arm 13 in a direction so as to move both tooth 19 near to step 7 and reference face 20 near reference face 11. In this position, the two cylindrical surfaces 6 and 18 are engaged sliding on one another. At a certain stage of the rotation, the resilient tooth 19 comes into contact with the second step 8 (detail of FIG. 11) until it partially clicks under it to the final position of FIG. 12, in which a firm locking occurs. In such a position, no movement is possible, with the obvious exception of the rotation in the opposite direction, thanks to the engagements of tooth 19 on step 7, of resilient tooth 18 against step 8 and of reference face 20 against reference face 11, which have portions with a knurled surface respectively 20a and 12 to prevent sliding.

The rotation in the opposite direction is shown in FIG. 13, in which, as also indicated by the arrows, each support arm 13, starting from a locked position (illustrated on the left), can either be arranged in the free-sliding position (centre) or, after a further small rotation, be extracted orthogonally to guide 5 (right).

In the central position of FIG. 13, each support arm 13 can be translated along whatever point of guide 5. The position can be calculated manually with the help of graduated line 10.

Referring again to FIG. 2, the shaft's two ends are placed in V-shaped housings 14 so that one or both of them abut against shoulders 15a herein provided for. In this way, the machine which collects workpiece 16 from the pallet knows its exact position.

When varying the dimension of workpiece 16, it is sufficient to operate as shown in FIG. 13, unlocking each arm 13 and then moving each one away from or nearer to the other, with reference to graduated line 10.

This operation can obviously be carried out automatically, being sufficient that a mobile-arms unit managed by a computer, for instance in a station of regulation provided for on the line, grips the support arms 13, rotates them by some degrees unclamping their sliding movement and moves them to the new position, rotating them in the opposite direction to lock them to guide 5. In reality, this mobile-arms unit, although it can be similar to a unit of an already existing type in the art briefly described hereinabove, is considerably simpler, for it does not need means to keep the support arms unlocked during their translation. In the pallet according to the invention, means to lock the translation, intended as devices expressly configured to create a friction between the guide and the support arms, are not provided for, the support arms 13 autolocking with a click to guide 5.

It must be stressed that support arms 13, in the position of free sliding on guide 5, are in fact physically disconnected from it. In fact, in order not to have a friction between tooth 21 and step 8, it is necessary to have a certain clearance, although minimum, between the two cylindrical surfaces 6 and 18.

Although guide 5 has been referred to as being made of only one part, obviously it cannot be excluded that it can be made of many separate elements. For example, guide 5 may comprise two aligned but separate sections, one for each support arm 13.

Furthermore, although support arms 13 have been described as having a unique V-shaped housing 14, for this reason it cannot be excluded that each arm 13 can have more housings 14 for the workpieces. For instance, the same support arm 13 can have two V-shaped housings, so that the pallet conveys two identical aligned workpieces at the same time, offering both of them to different machines, which can profitably provide for parallel manufacturing operations.

The pallet according to the invention attains the established object, improving the current knowledge and in particular being less expensive and more functional, allowing both the manual and the automatic regulation and, in this second case, requiring simpler regulation means.

The foregoing description of a specific embodiment will so fully reveal the invention according to the conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

We claim:

1. A pallet for holding at least one workpiece for automatic production lines wherein said pallet is conveyed along said lines by conveyor means, said pallet comprising:
   a base engaging with said conveyor means;
   a guide having a longitudinal axis mounted on said base;
   support arms engaging with said guide, said arms having a first end on which at least a portion of said workpiece can rest, a second end engaging with said guide, and a plane passing through said ends, said plane being transverse to the longitudinal axis of said pallet when in use;
   auto-locking means provided for at said second end for auto-locking engagement with said guide, said auto-locking means allowing movement of said support arms in said transverse plane between a first and a second position;
   whereby in said first position said support arms are capable of translation along said guide or of movement away from said guide in said transverse plane, and whereby in said second position said support arms releasably auto-lock onto said guide.

2. A pallet according to claim 1, wherein said movement in said transverse plane of said support arm is a rotation with respect to said guide's longitudinal axis between a first and a second angular position, whereby in said first angular position said support arms are able to translate along said guide or to be moved away from it in said transverse plane, and whereby in said second angular position said support arms are autolocked onto said guide.

3. A pallet according to claim 2, wherein said support arms and said guide comprise surfaces engaging one another parallel to said axis, said support arms being provided with resilient engagement means which interact with said guide when said arms are in said second position.

4. A pallet according to claim 2, wherein said support arms and said guide comprise surfaces engaging one another parallel to said axis, said guide being provided with resilient engagement means which interact with said support arms when said arms in said second position.

5. A pallet according to claim 4, wherein said support arms and said guide comprise surfaces abutting one another when said support arms are in said second position.

6. A pallet according to claim 5, wherein said surfaces abutting one another comprise portions having a high coefficient of friction.

7. A pallet according to claim 5, wherein said guide has a surface mutually engaging with said support arms, including a portion with a cylindrical surface, said cylindrical surface being interrupted by rims which constitute abutting surfaces for said support arms, said rims being a first and a second step-shaped edge diametrically opposed one to the other, and under said second step-shaped edge a reference face is provided for having a knurled surface.

8. A pallet according to claim 1, wherein said support arms and said guide comprise surfaces engaging one another parallel to said longitudinal axis, said arms being provided with resilient engagement means which interact with said guide when said support arms are in said second position.

9. A pallet according to claim 1, wherein said support arms and said guide comprises surfaces engaging one another parallel to said axis, said guide being provided with resilient engagement means which interact with said arms when said arms are in said second position.

10. A pallet according to claim 9, wherein said arms and said guide comprise surfaces abutting on one another when said arms are in said second position.

11. A pallet according to claim 10, wherein said guide has a surface mutually engaging with said support arms, including a portion with a cylindrical surface, said cylindrical surface being interrupted by rims which constitute abutting surfaces for said support arms, said rims being a first and a second step-shaped edge diametrically opposed one to the other, and under said second step-shaped edge a reference face is provided for having a knurled surface.

12. A pallet according to claim 10, wherein said support arms include a free end able to receive said workpieces and a tubular open sleeve end with a cylindrically-shaped internal housing, constituting the mutually engaging surface for said guide and having a nominal diameter equal to the portion of the guide with a cylindrical surface, said sleeve having open longitudinal edges comprising reference-surfaces for said support arms, said reference-surfaces for said support arms respectively being formed by a tooth, which is able to engage with the first step of said guide and a reference face, which is able to engage against the reference face of said guide.

13. A pallet according to claim 12, wherein said support arms have resilient engagement means comprising a resilient tooth able to engage with said second step of said guide.

14. A pallet according to claim 10, wherein said surfaces abutting one another comprise portions having a high coefficient of friction.

15. A pallet according to claim 14, wherein said guide has a surface mutually engaging with said support arms, including a portion with a cylindrical surface, said cylindrical surface being interrupted by rims which constitute abutting surfaces for said support arms, said rims being a first step-shaped edge and a second step-shaped edge diametrically opposed to the other, and under said second step-shaped edge a reference face is provided for having a knurled surface.

16. A pallet according to claim 15, wherein said support arms have said resilient engagement means comprising a resilient tooth able to engage with said second step of said guide.

17. A pallet according to claim 15, wherein said support arms offer a free end able to receive said workpieces and a tubular open sleeve end with a cylindrically-shaped internal housing constituting the mutually engaging surface for said guide and having a nominal diameter equal to the portion of the guide with a cylindrical surface, said sleeve having open longitudinal edges comprising reference-surfaces for said support arms, said reference-surfaces for said support arms respectively being formed by a tooth, able to engage with the first step of said guide and a reference face, able to engage against the reference face of said guide.

18. A pallet according to claim 17, wherein said support arms have said resilient engagement means comprising a resilient tooth able to engage with said second step of said guide.

19. A pallet according to claim 1, wherein said guide longitudinally has a flat surface comprising a graduated line which indicates the position of said support arms with respect to said guide.

* * * * *